(12) United States Patent  
Ender et al.

(10) Patent No.: US 6,722,639 B2  
(45) Date of Patent: Apr. 20, 2004

(54) LIQUID DISTRIBUTOR IN MASS TRANSFER COLUMN AND METHOD OF INSTALLATION AND USE

(75) Inventors: Christoph Ender, Wichita, KS (US); Tullio Petrich, Rome (IT)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 10/116,248

(22) Filed: Apr. 4, 2002

(65) Prior Publication Data

US 2002/0158350 A1 Oct. 31, 2002

Related U.S. Application Data

(60) Provisional application No. 60/282,894, filed on Apr. 10, 2001.

(51) Int. Cl.⁷ .................................................. B01F 3/04
(52) U.S. Cl. .......................................... 261/97; 261/110
(58) Field of Search ....................... 261/97, 110, 112.1, 261/112.2, DIG. 44, DIG. 85

(56) References Cited

U.S. PATENT DOCUMENTS

| | | | |
|---|---|---|---|
| 3,937,769 A | * | 2/1976 | Strigle et al. ............... 261/97 |
| 4,099,675 A | | 7/1978 | Wohler et al. |
| 4,159,291 A | | 6/1979 | Bruckert et al. |
| 4,264,538 A | | 4/1981 | Moore et al. |
| 4,479,909 A | | 10/1984 | Streuber |

(List continued on next page.)

FOREIGN PATENT DOCUMENTS

| | | |
|---|---|---|
| DE | 29 45 103 A | 5/1981 |
| DE | 30 13 783 A | 10/1981 |
| DE | 34 09 524 C | 9/1985 |
| EP | 0 501 615 A | 9/1992 |
| GB | 668 293 | 3/1952 |
| GB | 2 013 510 | 8/1979 |

*Primary Examiner*—Scott Bushey  
(74) *Attorney, Agent, or Firm*—Shook, Hardy & Bacon L.L.P.

(57) ABSTRACT

A mass transfer column is provided with a liquid distributor that distributes liquid to an underlying mass transfer bed containing one or more random, grid or structured packing elements. The liquid distributor includes a plurality of elongated troughs that are spaced apart and extend across the column. A plurality of liquid discharge holes are positioned in side walls of the trough and are located in one or more preselected planes that are preferably spaced above a floor of the trough. Splash baffles are spaced outwardly from the trough side walls and include upper portions that are positioned to receive liquid exiting the troughs through the discharge holes. Lower portions of the splash baffles form a constricted discharge outlet in a plane below the trough for delivering liquid from the splash baffles to the underlying mass transfer bed. The liquid discharge holes in one of the trough side walls are offset from those in the other trough side wall to provide a more uniform distribution of liquid to the discharge outlet. The splash baffles are vertically adjustable and are intended to be supported on the upper surface of the mass transfer bed so that the discharged liquid is delivered directly to the mass transfer bed, thereby reducing the opportunity for the falling liquid to become entrained in a vapor stream flowing upwardly through the mass transfer bed. The liquid exiting through the discharge outlet preferably forms a curtain-like flow that blocks or impedes vapor entry upwardly into the discharge outlet. Any vapor that enters the discharge area is able to vent upwardly through the open spacing between the baffles and the associated troughs at a reduced velocity, thereby reducing the opportunity for liquid entrainment. The open spacing also permits any overflow of liquid from the troughs to be captured by the splash baffles for downward flow along the inner faces of the splash baffles.

31 Claims, 5 Drawing Sheets

U.S. PATENT DOCUMENTS

| | | |
|---|---|---|
| 4,689,183 A | 8/1987 | Helms et al. |
| 4,708,856 A | 11/1987 | Rukovena, Jr. |
| 4,729,857 A | 3/1988 | Lee et al. |
| 4,816,191 A | 3/1989 | Berven et al. |
| 4,855,089 A | 8/1989 | Michels |
| 4,895,075 A | 1/1990 | Munzel |
| 4,909,967 A * | 3/1990 | Binkley et al. ............... 261/97 |
| 5,051,214 A | 9/1991 | Chen et al. |
| 5,192,465 A * | 3/1993 | Petrich et al. ................ 261/97 |
| 5,906,773 A | 5/1999 | Hausch et al. |
| 6,293,526 B1 | 9/2001 | Fisher et al. |
| 6,502,806 B2 * | 1/2003 | Richardson .................. 261/97 |
| 2002/0041040 A1 | 4/2002 | Fisher et al. |

* cited by examiner

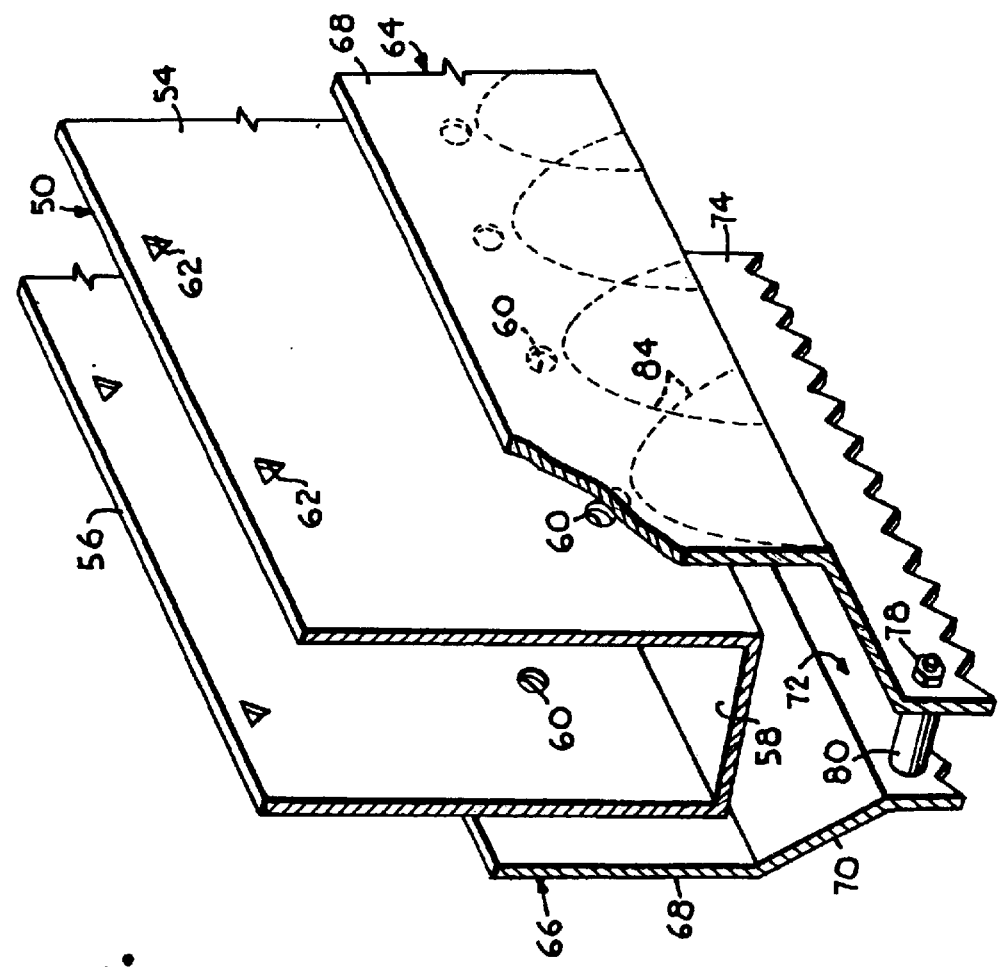
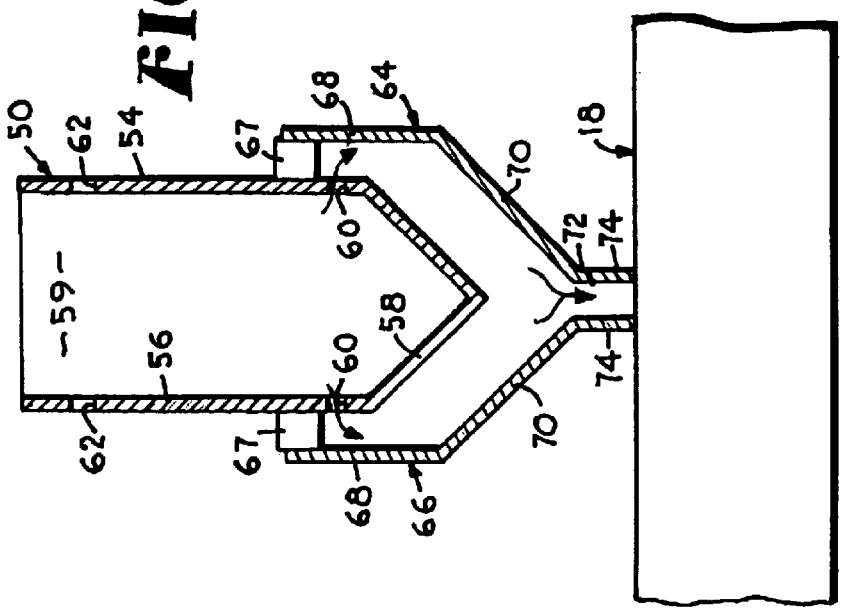

LIQUID DISTRIBUTOR IN MASS TRANSFER COLUMN AND METHOD OF INSTALLATION AND USE

CROSS-REFERENCE TO RELATED APPLICATION

This application claims the benefit of provisional application Serial No. 60/282,894 filed Apr. 10, 2001 now abandoned.

BACKGROUND OF THE INVENTION

The present invention relates in general to mass transfer columns and, more particularly, to liquid distributors used in such columns and methods of distributing liquid using the liquid distributors.

Uneven liquid distribution can lead to poor contact and mass transfer between ascending vapor streams and descending liquid streams in packing sections of mass transfer columns. Trough-like liquid distributors are commonly used in such columns to receive liquid from an overlying region and redistribute it in a more uniform manner to the underlying packing bed. These liquid distributors can be open at the top and bottom, with reduced spacing between the bottom side walls so that the liquid is funneled into a curtain or sheet-like flow as it exits the distributor. Liquid fed by a drip tube style liquid distributor will spread on the structured packing surface and will descend along the plate corrugations that extend in only one direction. The underlying layer of packing is rotated by 90 degrees and will spread liquid in the other direction, thereby achieving complete wetting of the packing surface. In another type of distributor, such as disclosed in U.S. Pat. No. 4,816,191 to Berven et al., the bottom of the distributor is closed and overflow holes are provided at preselected levels in the side walls of the distributor. The liquid exiting the overflow holes contacts splash baffles, which are positioned in spaced relationship from the distributor side walls. The liquid then flows down the splash baffles and drips from a lower drip edge into the packing bed along a drip-line, thereby requiring only one layer of structured packing to spread the liquid across the packing in both directions.

One problem associated with convention liquid distributors is the descending liquid may become entrained in the ascending vapor stream. In liquid distributors of the type disclosed in U.S. Pat. No. 4,816,191, entrainment may result from vapor flowing upwardly in the spacing between the splash baffles and the distributor side wall. In addition, the liquid is evenly divided between both splash baffles, thereby providing opportunity for entrainment as vapor ascends along the inner face of both splash baffles. In other liquid distributors, such as illustrated in EP 0282753B1, a second plate spaced from the splash baffle is used to shield the liquid as it splashes against and drains downwardly along the splash baffle. Because the lower edge of the splash baffle is spaced above the upper surface of the underlying mass transfer bed, the risk of liquid entrainment is still present as the liquid travels downwardly in the spacing between the lower edge of the splash baffle and the upper surface of the mass transfer bed. In addition, the spacing between the upper end of the splash baffle and the distributor side wall is closed by a flange that interconnects the splash baffle to the distributor side wall. This flange blocks upward escape of any vapor that has entered the spacing between the splash baffle and the second plate.

SUMMARY OF THE INVENTION

In one aspect, the present invention is directed to a liquid distributor for use in a mass transfer column having a mass transfer bed located in an open internal region within the column. The liquid distributor functions to uniformly distribute a descending liquid stream across the mass transfer bed for interaction with an ascending vapor stream. The liquid distributor has one or more optional feed boxes which deliver the liquid stream to at least one, and preferably a plurality of, underlying elongated troughs that extend across the column in parallel relationship. The troughs are spaced apart to permit vapor to flow upwardly in the spacing between adjacent troughs. Each trough has spaced apart first and second side walls that are interconnected by a floor. A plurality of liquid discharge holes are positioned in at least the first side wall, and preferably both side walls in an offset pattern. The liquid distributor further includes first and second splash baffles having lower portions forming a constricted discharge opening in a plane below the trough. At least the first splash baffle has an upper segment that is spaced outwardly from the first side wall and extends upwardly a sufficient distance in relation to the liquid discharge holes so that liquid exiting from the liquid discharge holes splashes against and runs down along an inner face of the splash baffle. The second splash baffle may also have a similar or identical upper segment spaced from the second side wall of the trough. At least the first splash baffle and preferably both splash baffles are vertically adjustable in relation to the trough so that they may be lowered onto the upper surface of the mass transfer bed. In this manner, the liquid is delivered from the constricted discharge outlet of the trough directly onto the upper surface of the mass transfer bed without having to travel through a vapor stream, which could cause entrainment of a portion of the liquid stream. In one embodiment, the liquid distributor contains a serrated drip edge that extends downwardly from the discharge outlet to deliver at least a portion of the liquid into the mass transfer bed, rather than just delivering it onto the upper surface thereof. Another advantage of the liquid distributor is the constricted discharge outlet blocks or impedes entry of vapor upwardly through the discharge outlet where it could interfere with the desired downward flow of liquid. The offset pattern of liquid discharge holes in the trough side walls allows for a more uniform distribution of liquid along the discharge outlet, thereby further reducing the opportunity for vapor entry into the discharge outlet. Any vapor entering the discharge outlet can flow upwardly through a significantly larger vapor outlet formed in the open spacing between the splash baffles and the trough at significantly lower vapor velocity, thereby minimizing the opportunity for liquid descending along the splash baffle to become entrained in the ascending vapor. Liquid that exits the trough through the overflow holes, or which simply spills over the top of the trough side walls, is able to enter this open spacing and is contained by the splash baffles for downwardly flow along the inner faces of the baffles. The mass transfer bed can comprise random, grid and/or structured packing elements, but preferable structured packing.

In another aspect, the invention is directed to a method of distributing liquid to the mass transfer bed using the liquid distributor described above to block or impede entry of vapor upwardly through the constricted discharge outlet formed between the splash baffles. Delivering the liquid directly onto the upper surface of the mass transfer bed while shielding the liquid from the vapor stream further reduces the opportunity for entrainment of liquid in the ascending vapor stream. The method includes permitting any vapor entering the discharge outlet to escape upwardly from the area between the splash baffles and the trough at significantly lower vapor velocity to minimize liquid entrainment from the splash baffle.

In a further aspect, the invention includes a method of installing the liquid distributor in the column by installing the troughs and then adjusting the splash baffles downwardly so that they are supported on the upper surface of the underlying mass transfer bed, thereby eliminating or reducing any gaps between the lower edges of the splash baffles and the mass transfer bed that can lead to liquid entrainment in the vapor stream. The adjustable nature of the splash baffles is particularly helpful in those instances where the troughs and the upper surface of the mass transfer bed are not parallel.

BRIEF DESCRIPTION OF THE DRAWINGS

In the accompanying drawings which form a part of the specification and are to be read in conjunction therewith, and in which like reference numerals are used to indicate like parts in the various views:

FIG. 4 is an enlarged side elevation view of a portion of the liquid distributor with a double baffle taken along line 4—4 of FIG. 3 in the direction of the arrows;

FIG. 5 is a fragmentary end perspective view of another embodiment of the liquid distributor with a double baffle of the present invention, with a liquid flow pattern on a splash baffle being illustrated schematically;

DESCRIPTION OF THE PREFERRED EMBODIMENTS

Figure 1:
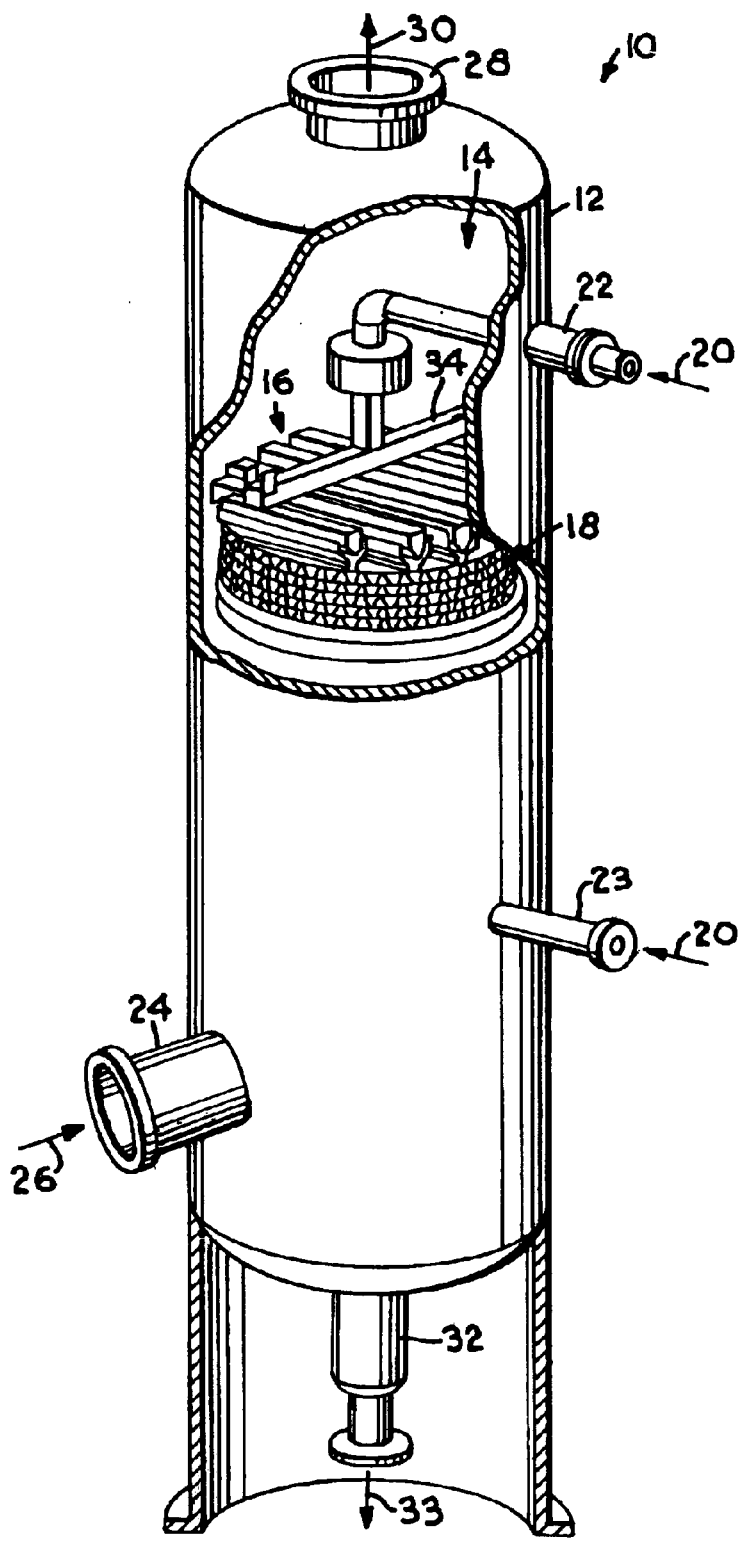
FIG. 1 is a side perspective view of a mass transfer column with portions of a shell of the column broken away to show an internal mass transfer bed and a liquid distributor constructed in accordance with the present invention.

Referring now to the drawings in greater detail, and initially to FIG. 1, a mass transfer or heat exchange column is designated generally by the numeral 10 and includes an upright cylindrical shell 12 which defines an open interior region 14 in which one or more liquid distributors 16 of the present invention and one or more mass transfer beds 18 are located. The liquid distributor 16 is used to more uniformly distribute one or more descending liquid streams across the horizontal cross section of the mass transfer bed 18, which in turn facilitates contact between the descending liquid stream and one or more ascending vapor streams. The mass transfer bed 18 comprises various known types of mass transfer devices, including but not limited to those conventionally known as structured, grid or random packing.

Column 10 is of a type used for processing liquid and vapor streams, including to obtain fractionation products. Although column 10 is shown in a cylindrical configuration, other shapes, including polygonal may be used. The column 10 is of any suitable diameter and height, and is constructed from suitably rigid materials that are preferably inert to, or otherwise compatible with, the fluids and conditions present within the column 10.

Liquid streams 20 are directed to the column 10 through feed lines 22 and 23 positioned at appropriate locations along the height of the column 10. Feed line 22 will normally carry only liquid, but feed line 23 may carry vapor with the liquid or in place of the liquid. Although only two liquid feed lines 22 and 23 are shown in the drawings for simplicity of illustration, it will be appreciated by those of ordinary skill in the art that additional liquid feed lines carrying other liquid streams may be utilized if desired. Similarly, only one vapor feed line 24 carrying a vapor stream 26 is illustrated, but additional vapor feed lines and vapor streams can be included if necessary or desired for the vapor and liquid processing occurring within the column 10. It will also be appreciated that the vapor stream 26 can be generated within the column 10 rather than being introduced into the column 10 through the feed line 24. The column 10 also includes an overhead line 28 for removing a vapor product or byproduct 30 and a bottom stream takeoff line 32 for removing a liquid product or byproduct 33 from the column 10. Other column components such as reflux stream lines, reboilers, condensers, vapor horns and the like are not illustrated because they are conventional in nature and are not believed to be necessary for an understanding of the present invention.

Figure 2:
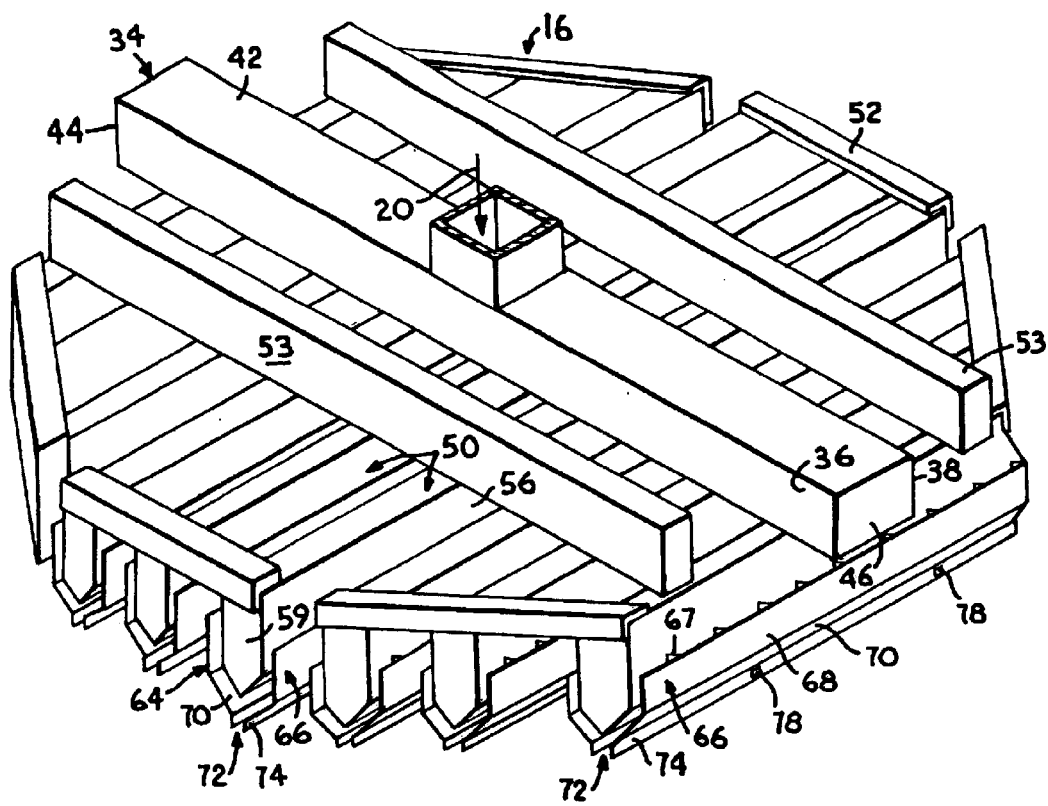
FIG. 2 is an enlarged perspective view of the liquid distributor shown in FIG. 1.
Figure 3:
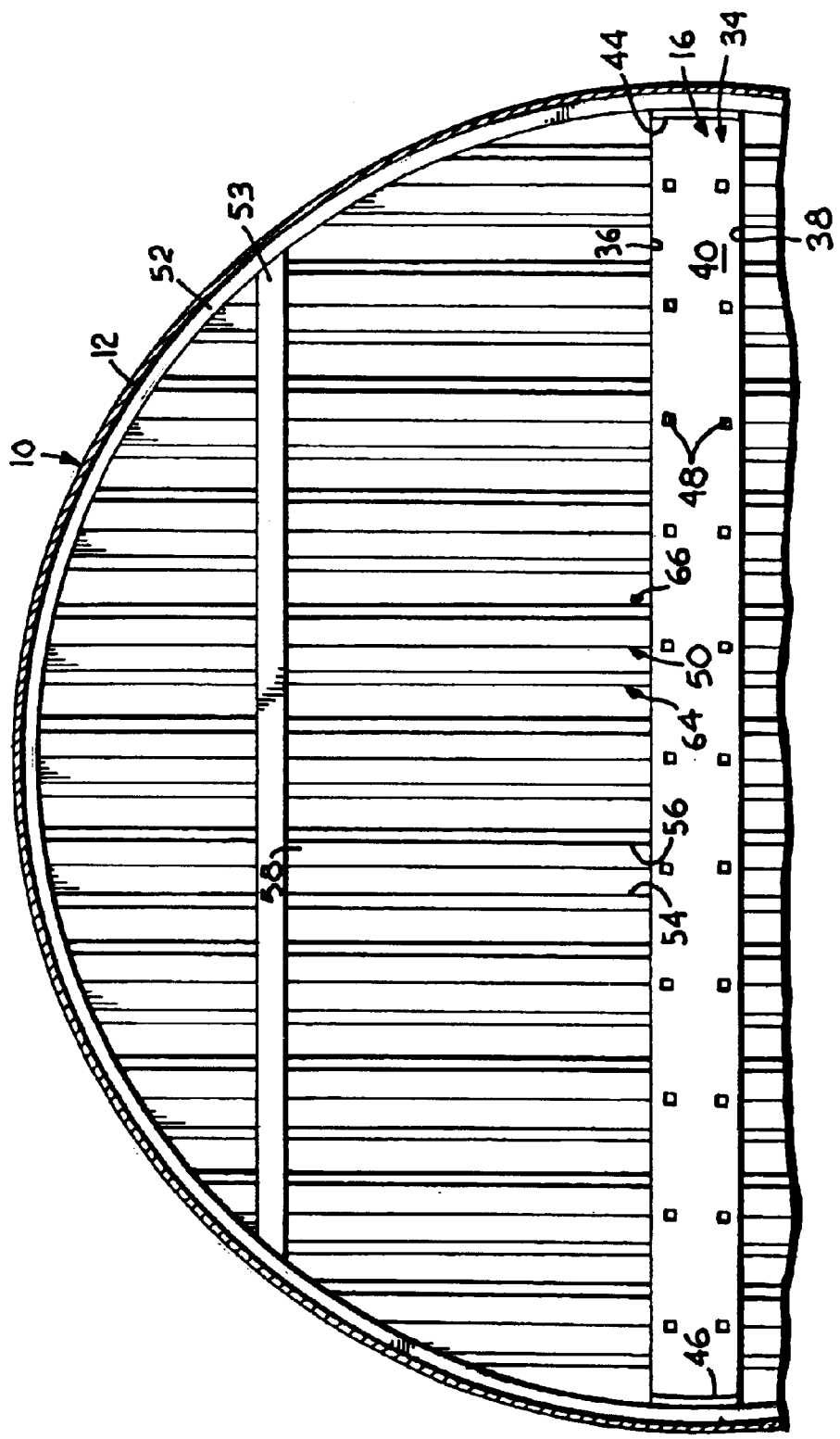
FIG. 3 is a fragmentary top plan view of the liquid distributor.

Turning now additionally to FIGS. 2 and 3, the liquid distributor 16 constructed in accordance with the present invention preferably includes an elongated central feed box 34 which receives liquid from a liquid stream, such as the liquid stream 20 which has been delivered by the liquid feed line 22 to the open internal region 14 of the column 10. It will be appreciated that the feed box 34 need not receive liquid directly from the outlet of the liquid feed line 22, but the liquid may instead be first subjected to one or more processing steps and then collected by a collector (not shown) for delivery to the feed box 34. The feed box 34 preferably extends horizontally in a first direction and is of a length corresponding to the diameter of the column 10 or at least a substantial portion thereof.

The feed box 34 has opposed side walls 36 and 38 connected by a floor 40, a cover 42 and end walls 44 and 46. It will be appreciated that the cover 42 is optional and need not be present in most applications. A plurality of holes 48 are provided in the floor 40 and/or the side walls 36 and 38 of the feed box 34 to deliver liquid to a plurality of elongated troughs 50 which underlie the feed box 34. The troughs 50 are placed in side-by-side and spaced-apart relationship and preferably extend parallel to each other in a longitudinal direction that is perpendicular to the longitudinal direction of the feed box 34. The troughs 50 preferably extend completely across the column 10 and are supported at their ends by an overlying ring 52 welded to the inner surface of the shell 12. Other means of support can be used; such as intermediately positioned beams 53 located above the troughs 50, by attaching the troughs 50 to the feed box 34, and by a distributor support grid (not shown) placed directly on the mass transfer bed 18. The number of troughs 50 and the spacing therebetween can be varied to meet the particular liquid and vapor load requirements of intended applications.

Figure 6:
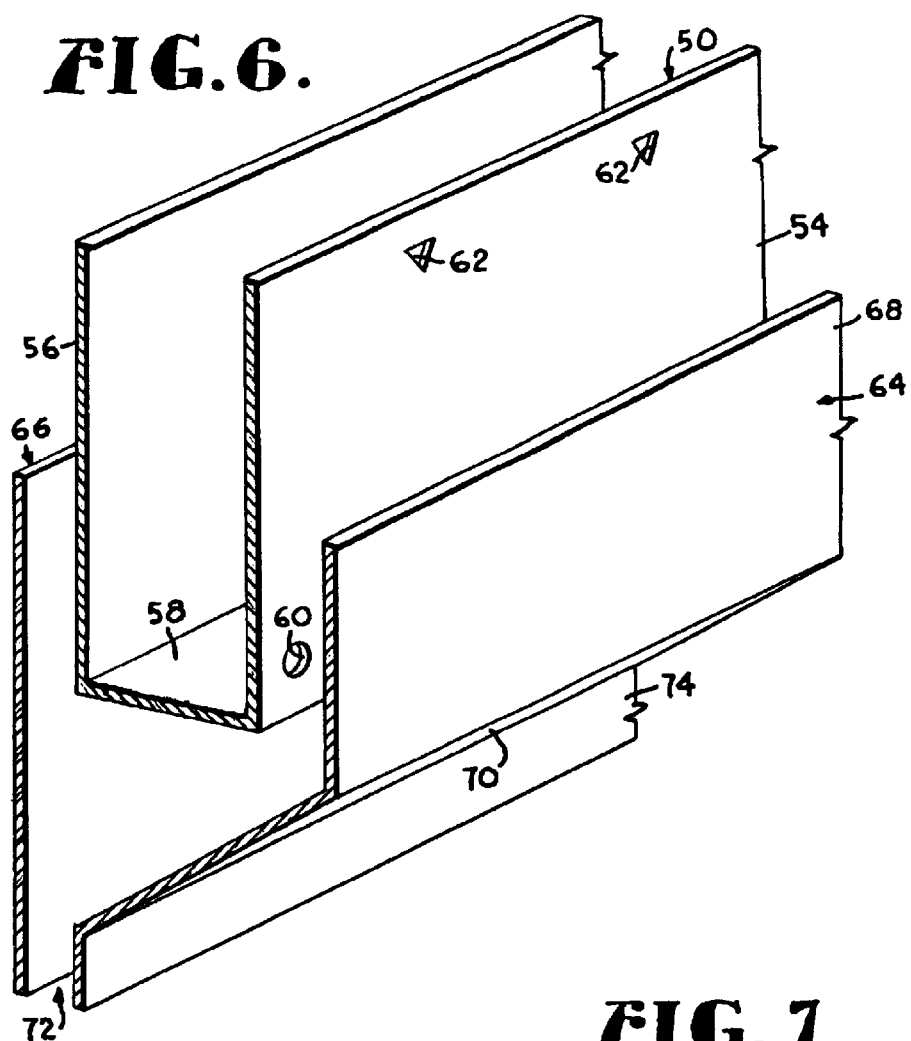
FIG. 6 is a fragmentary end perspective view of a further embodiment of the liquid distributor with a single baffle of the present invention.
Figure 7:
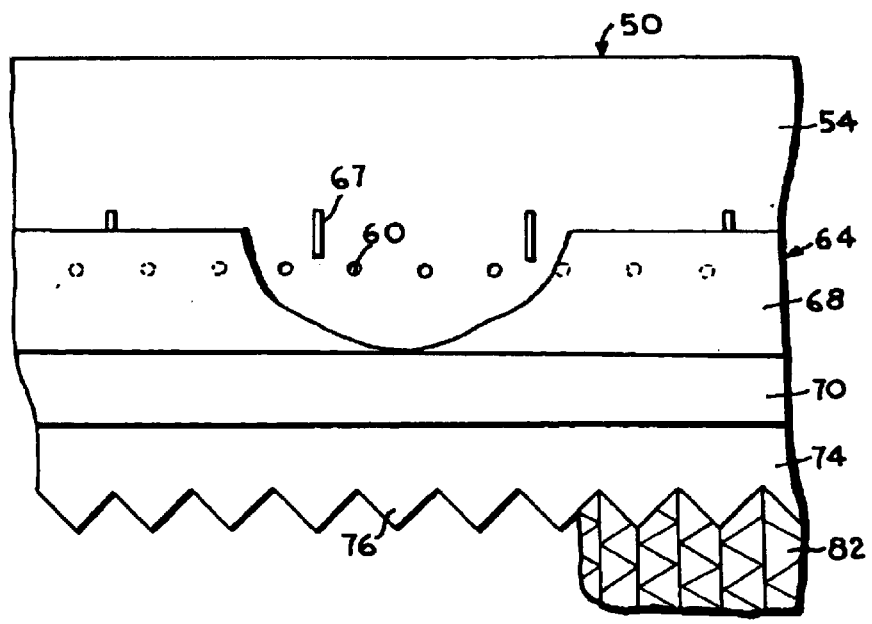
FIG. 7 is a fragmentary side elevation view of the liquid distributor shown in FIG. 4 with portions broken away to illustrate the placement of liquid discharge holes in a side wall of a trough which forms part of the liquid distributor.

Turning additionally to FIGS. 4 and 7, each trough 50 includes a pair of spaced apart and longitudinally extending side walls 54 and 56 which are interconnected at their lower edges by a floor 58. The particular configuration of the floor 58 can be varied as desired. For example, the floor 58 can include one or more inclined segments, including the two angled segments that for a V-shape profile as illustrated in FIG. 4. Alternatively, the floor 58 can be planar and perpendicular to the planes of the side wall 54 and 56 as shown in FIGS. 5 and 6. The ends of the trough 50 are preferably closed by end walls 59, which are joined to the side walls 54 and 56 and 58. The top of the trough 50 is preferably open, but can be partially or completely covered as long as suitable provision is made for permitting liquid entry into the troughs 50 from the feed box 34.

The troughs 50 each include a plurality of spaced apart liquid discharge holes 60 that are located in the floor 58 and/or the side walls 54 and 56. The discharge holes 60 are preferably positioned a preselected distance above the floor 58 or the lowest portion thereof so that liquid must accumulate within the trough 50 before being discharged through the discharge holes 60. By elevating the discharge holes 60 in this fashion, any solids present in the liquid stream will have an opportunity to settle to the bottom of the trough 50 so that they do not plug the discharge holes 60 or other downstream orifices. The discharge holes 60 are uniformly spaced apart along the longitudinal length of the troughs 50 and are preferably arranged so that the discharge holes 60 in one side wall 54 are offset from the discharge holes 60 in the other side wall 56. Alternatively, the discharge holes 60 in the side walls 54 and 56 may be in alignment or arranged in some other pattern. The discharge holes 60 are preferably positioned in a common horizontal plane, but can be grouped into two or more horizontal planes if desired. The discharge holes 60 are normally circular and are of the same size, but can be other shapes and of differing sizes.

The troughs 50 may also include a series of overflow holes 62 positioned near the top of the side walls 54 and 56. The overflow holes 62 are preferably of a triangular shape with the base of the triangular opening being located above the apex of the opening. The overflow holes 62 are of a larger size than the discharge holes 60 and normally discharge liquid only when the liquid flow rate into the trough 50 exceeds the rate at which the liquid can be discharged through the discharge holes 60.

In accordance with the present invention, each trough 50 in the liquid distributor 16 includes a pair of splash baffles 64 and 66 that are normally positioned on opposite sides of the trough 50. The splash baffles 64 and 66 in the preferred embodiment each include a first or upper segment 68 that extends longitudinally along all or at least a substantial portion of the length of the associated side wall 54 or 56, and is spaced outwardly therefrom by a preselected distance. A plurality of spacers 67 are positioned between the upper segment 68 and the adjacent trough side wall 54 and 56 at spaced apart locations to maintain the desired spacing between the upper segments 68 and the side walls 54 and 56. In order to preserve the ability of the upper segment 68 to move up and down in relation to the trough 50, the spacers 67 are preferably secured to either the inner face of the upper segment 68 or the outer face of the associated trough side wall 54 and 56, but not both.

The upper segment 68 preferably extends substantially vertically and has a sufficient height so that, when the splash baffles 64 and 66 are positioned in the manner described below, liquid discharged from the discharge holes 60 in the trough 50 impact against the facing or inner surface of the upper segment 68. A second or inclined segment 70 extends along and is connected to a lower edge of the upper segment 68 in each splash baffle 64 and 66. The inclined segments 70 in each pair of splash baffles 64 and 66 extend inwardly toward each other at approximately a 45 degree angle, or some other preselected angle. The particular angle of inclination of the inclined segments 70 is not of particular significance as long as liquid is able to drain along its surface at a sufficient rate and the resulting vertical dimension of the inclined segments 70 does not exceed the open space available under the trough 50.

The lower edges of the inclined segments 70 are spaced from each other a preselected distance to form an elongated liquid discharge outlet 72 that preferably extends longitudinally along the entire column 10 cross section and has a reduced cross-sectional area in comparison to the area between the upper segments 68. The distance between the lower edges of the inclined segments 70, which corresponds to the transverse width of the discharge outlet 72, is selected so that, under operating conditions, a curtain-like stream of liquid flows out of the discharge outlet 72 to block or impede vapor from flowing upwardly through the discharge outlet 72. At the same time, the liquid discharge outlet 72 should be of a sufficient size so that liquid does not back up and accumulate above the outlet 72 during designed flow conditions. The designed width should also permit any solids in the liquid stream to pass through the discharge outlet 72 without becoming lodged therein. A minimum width of approximately 2 mm is believed necessary to achieve the above objectives.

A vertical drip edge 74 extends downwardly from the lower edge of each inclined segment 70 and functions to shield the liquid exiting the discharge outlet 72 from the surrounding vapor flow. Each drip edge 74 preferably has a serrated or saw-toothed lower profile with a plurality of uniformly shaped and spaced apart teeth 76. The teeth 76 in one drip edge 74 can be aligned or offset from the teeth 76 in the paired drip edge 74. The paired drip edges 74, instead of extending in vertical and parallel relationship, may extend toward each other in a downward direction to further reduce the area available for flow of discharged liquid.

The paired splash baffles 64 and 66 are joined to each other in a manner that allows vertical movement of the baffles 64 and 66 in relation to the associated trough 50. This is preferably accomplished using fasteners such as nut and bolt assemblies 78 that extend through the drip edges 74 and/or the inclined segments 70 and exert an inwardly directed biasing force on the upper segments 68. The nut and bolt assemblies 78 include a washer or other spacer 80 that maintains the desired spacing between the lower edges of the inclined segments. Other means of joining the splash baffles 64 and 66 together can be utilized so long as the ability to move the baffles 64 and 66 up and down is maintained.

The liquid distributor 16 is installed in the column 10 at a preselected position above the mass transfer bed 18 by supporting the troughs 50 on the ring 52 and/or by using support beams 53 or other support means. Although the feed box 34 is preferably used to deliver liquid to the troughs 50, it will be appreciated that collectors (not shown) or other devices may be used in place of the feed box 34 for that purpose. The splash baffles 64 and 66 may be easily inserted into the column 10 concurrently with the troughs 50 by simply nesting the paired splash baffles 64 and 66 onto the associated trough 50. To facilitate the nesting of the splash baffles 64 and 66 against the trough 50, the baffle inclined segments 70 and the trough floor 40 can be of a complementary configuration. It will, of course, be appreciated that the splash baffles 64 and 66 can be inserted into position after the troughs 50 are installed within the column 10.

Once the troughs 50 are installed, the nested splash baffles 64 and 66 are simply lowered until they are supported on the top surface of the underlying mass transfer bed 18. When the drip edge 74 is supported on the mass transfer bed 18, the upper segment 68 of the splash baffles 64 and 66 extend above the plane in which liquid exits the discharge holes 60 in the troughs 50 so that all or substantially all of the liquid exiting the discharge holes 60 is captured by the splash baffles and is funneled downwardly first along the upper segment 68 and then along the inclined segments 70 to the constricted discharge outlet 72. The liquid then exits through the discharge outlet 72 and travels down the drip edge 74 into the mass transfer bed 18 as a uniform curtain of fluid that serves to impede any vapor entry into the discharge outlet 72. The vapor streams ascending upwardly through the mass transfer bed 18 will instead preferentially flow in the open spacing outwardly of the splash baffles 64 and 66.

As can be seen in FIG. 7, if structured packing is used as the mass transfer bed 18, the troughs 50 are preferably oriented so that their discharge outlets 72 extend transversely to the plane of the individual corrugated plates 82 in the uppermost layer of packing. In this manner, the curtain of liquid is spread laterally by the corrugations in the plates 82 to provide a uniform distribution of liquid across the horizontal cross section of the mass transfer bed 18.

Because the splash baffles 64 and 66 are not fixed to the trough 50, they can be lowered into contact with the top surface of the underlying mass transfer bed 18, even if the top surface is not parallel to the plane of the troughs 50. This ability to adjust the splash baffles 64 and 66 to bring their lower edge into contact with the packing or other elements in the mass transfer bed 18 reduces or eliminates any gaps that might be formed between the lower edge of the splash baffles 64 and 66 and the mass transfer bed 18. Such gaps are undesirable because they could allow liquid being discharged from the discharge outlet 72 to become entrained in the ascending vapor, thereby reducing the efficiency of the net mass transfer occurring within that portion of the column 10 and increasing the potential for liquid maldistribution. In addition, the sawtooth profile of the drip edge 74 allows the teeth 76 to extend down into mass transfer bed 18 so that the liquid can be delivered within, rather than just on top of, the mass transfer bed 18.

It will be appreciated that the spaced apart discharge holes 60 in the trough side walls 54 and 56 cause discrete areas of heavier liquid flow downwardly along portions of the splash baffles 64 and 66, as illustrated schematically by overlapping arched flow lines 84 in FIG. 5. The triangular pitch of the discharge holes 60 in the side walls 54 and 56 of the troughs 50 serves to lessen the magnitude of these flow differences because the areas of peak flow along one splash baffle 64 are offset from the corresponding areas of peak flow along the other splash baffle 66. In this manner, the combined flows from the paired splash baffles 64 and 66 results in a more uniform distribution of liquid flow along the longitudinal length of the discharge outlet 72.

The opening between the top edge of the splash baffles 64 and 66 and the trough side walls 54 and 56 allows any vapor entering the discharge area to ascend through the opening rather than interfering with the downward flow of liquid. The opening is also advantageous because it permits liquid exiting the troughs 50 through the overflow holes 62 to splash against and flow downwardly along the inner surfaces of the splash baffles 64 and 66.

In a variation of the liquid distributor 16 adapted for low liquid flow rates, discharge holes 60 can be provided in only one of the trough side walls 54 or 56. In such an embodiment, such as shown in FIG. 6, liquid splashes against and flows downwardly along only one splash baffle 64. Because the other splash baffle 66 receives no liquid and merely serves to form the discharge outlet 72, it need not be positioned outwardly from the trough side wall 56 and can instead be formed as a vertical or inclined plate underlying the trough floor 40.

It can also be appreciated that the paired splash baffles 64 and 66 need not be constructed identically to each other so long as the constricted discharge outlet 72 is formed between the lower edges of the splash baffles.

From the foregoing, it will be seen that this invention is one well adapted to attain all the ends and objectives hereinabove set forth together with other advantages which are inherent to the structure described and disclosed.

It will be understood that certain features and subcombinations are of utility and may be employed separately and without reference to other features and subcombinations. This is contemplated by and within the scope of the claims.

Since many possible embodiments may be made of the invention disclosed herein without departing from the scope thereof, it is to be understood that all matter herein set forth or shown in the accompanying drawings is to be interpreted as illustrative and not in a limiting sense.

Having thus described the invention, what is claimed is:

1. A liquid distributor comprising:
at least one elongated trough having spaced apart first and second side walls interconnected by a floor;
a plurality of liquid discharge holes positioned in at least said first side wall; and
first and second splash baffles having lower portions forming a constricted discharge opening in a plane below said trough, at least said first splash baffle having an upper segment spaced outwardly from said first side wall and extending upwardly a sufficient distance in relation to said liquid discharge holes to receive liquid exiting from said liquid discharge holes when liquid is present in said trough, at least said first splash baffle being vertically adjustable in relation to said trough.

2. The liquid distributor of claim 1, wherein a top edge of said first splash baffle is positioned above said liquid discharge holes in said first side wall.

3. The liquid distributor of claim 2, including liquid discharge holes positioned in said second side wall, the second splash baffle having an upper segment spaced outwardly from said second side wall, with a top edge of said upper segment of the second splash baffle being positioned above said liquid discharge holes in said second side wall.

4. The liquid distributor of claim 3, wherein said liquid discharge holes in said first side wall are offset from said liquid discharge holes in said second side wall of the trough.

5. The liquid distributor of claim 1, including a vapor opening between said upper segment of said first splash baffle and said first side wall to permit removal of vapor when present between said first splash baffle and said first side wall.

6. The liquid distributor of claim 1, wherein said first splash baffle includes a drip edge extending downwardly from said constricted discharge opening.

7. The liquid distributor of claim 6, wherein said drip edge has a serrated lower edge containing spaced apart teeth.

8. The liquid distributor of claim 1, including liquid overflow holes spaced above said liquid discharge holes in said first side wall of the trough and including a liquid inlet positioned between said upper segment of said first splash baffle and said first side wall to receive liquid exiting through said liquid overflow holes when liquid is present in said trough.

9. The liquid distributor of claim 1, including spacers positioned between said first splash baffle and said first side wall of the trough.

10. The liquid distributor of claim 9, wherein said spacers are secured to one of said first splash baffle and said first side wall and are slidable vertically along the other of said first splash baffle and said first side wall.

11. The liquid distributor of claim 10, including a fastener joining together said lower portions of the first and second splash baffles and exerting a biasing force urging said first splash baffle toward said first side wall of the trough.

12. The liquid distributor of claim 1, including liquid discharge holes positioned in said second side wall, the second splash baffle having an upper segment spaced outwardly from said second side wall, with a top edge of said upper segment of the second splash baffle being positioned above said liquid discharge holes in said second side wall, and including a drip edge extending downwardly from said first splash baffle and another drip edge extending downwardly from said second splash baffles at said constricted discharge opening.

13. The liquid distributor of claim 12, wherein said drip edges have serrated lower edges containing spaced apart teeth.

14. The liquid distributor of claim 13, wherein said teeth in one of said drip edges are offset from the teeth in the other of said drip edges.

15. The liquid distributor of claim 1, including a feed box positioned above said trough and having a liquid outlet positioned for directing liquid into said trough.

16. A mass transfer column comprising:

a shell defining an open internal region;

a mass transfer bed positioned within said open internal region and having an upper surface; and a liquid distributor positioned above said mass transfer bed within said open internal region and comprising:
 a plurality of elongated horizontal troughs extending in generally parallel relationship in a first direction, each trough having spaced apart first and second side walls interconnected by a floor;
 a plurality of liquid discharge holes positioned in at least said first side wall; and
 first and second splash baffles having lower portions forming a constricted discharge opening in a plane below said trough, at least said first splash baffle having an upper segment spaced outwardly from said first side wall and extending upwardly a sufficient distance in relation to said liquid discharge holes to receive liquid exiting from said liquid discharge holes when liquid is present in said trough, at least said first splash baffle being vertically adjustable in relation to said trough and being supported on said upper surface of said mass transfer bed.

17. The mass transfer column of claim 16, wherein a top edge of said first splash baffle is positioned above said liquid discharge holes in said first side wall.

18. The mass transfer column of claim 17, including liquid discharge holes positioned in said second side wall, the second splash baffle having an upper segment spaced outwardly from said second side wall, with a top edge of said upper segment of the second splash baffle being positioned above said liquid discharge holes in said second side wall.

19. The mass transfer column of claim 18, wherein said liquid discharge holes in said first side wall are offset from said liquid discharge holes in said second side wall of the trough.

20. The mass transfer column of claim 16, including a vapor opening between said upper segment of said first splash baffle and said first side wall to permit removal of vapor when present between said first splash baffle and said first side wall.

21. The mass transfer column of claim 16, wherein said first splash baffle includes a drip edge extending downwardly from said constricted discharge opening.

22. The mass transfer column of claim 21, wherein said drip edge has a serrated lower edge containing spaced apart teeth.

23. The mass transfer column of claim 16, including liquid overflow holes spaced above said liquid discharge holes in said first side wall of the trough and including a liquid inlet positioned between said upper segment of said first splash baffle and said first side wall to receive liquid exiting through said liquid overflow holes when liquid is present in said trough.

24. The mass transfer column of claim 16, including spacers positioned between said first splash baffle and said first side wall of the trough.

25. The mass transfer column of claim 24, wherein said spacers are secured to one of said first splash baffle and said first side wall and are slidable vertically along the other of said first splash baffle and said first side wall.

26. The mass transfer column of claim 25, including a fastener joining together said lower portions of the first and second splash baffles and exerting a biasing force urging said first splash baffle toward said first side wall of the trough.

27. The mass transfer column of claim 16, including liquid discharge holes positioned in said second side wall, the second splash baffle having an upper segment spaced outwardly from said second side wall, with a top edge of said upper segment of the second splash baffle being positioned above said liquid discharge holes in said second side wall, and including a drip edge extending downwardly from said first splash baffle and another drip edge extending downwardly from said second splash baffles at said constricted discharge opening.

28. The mass transfer column of claim 27, wherein said drip edges have serrated lower edges containing spaced apart teeth.

29. The mass transfer column of claim 28, wherein said teeth in one of said drip edges are offset from the teeth in the other of said drip edges.

30. The mass transfer column of claim 29, wherein said mass transfer bed comprises structured packing plates oriented at an angle from said first direction of said elongated troughs.

31. The mass transfer column of claim 16, including a feed box positioned above said trough and having a liquid outlet positioned for directing liquid into said trough.

* * * * *